Patented July 18, 1950

2,515,905

UNITED STATES PATENT OFFICE 2,515,905

PYRROLE DIMETHINECYANINE DYES

Robert H. Sprague and Leslie G. S. Brooker, Rochester, N. Y., assignors to Eastman Kodak Company, Rochester, N. Y., a corporation of New Jersey No Drawing. Application October 5, 1946, Serial No. 701,396

4 Claims. (Cl. 260—240)

This invention relates to pyrrole dimethinecyanine dyes and to a process for preparing them. This application is a continuation-in-part of our copending application, Serial No. 407,033, filed August 15, 1941 (now United States Patent 2,409,612, dated October 22, 1946) which is a division of our application, Serial No. 317,726 filed February 7, 1940 (now U. S. Patent 2,298,731, dated October 13, 1942.)

In our application 407,033, we have described pyrrole dimethinecyanine dyes which are useful as light-screening substances in photographic elements. These pyrrole dimethinecyanine dyes while related in some respects to indole dimethinecyanine dyes (purported to have been prepared by condensing an α-methylindole, diphenylformamidine and a cyclammonium quaternary salt containing a reactive methyl group, in the presence of acetic anhydride), cannot be prepared in a manner analogous to that set forth for the indole dyes.

We have found certain new pyrrole dimethinecyanine dyes (some of which are disclosed in our parent application 407,033) and these new dyes are of particular value in treatment of particular kinds of worm infestations. Our new compounds cannot be prepared in a manner analogous to that set forth for the aforesaid indole dimethinecyanine dyes. It is, accordingly, an object of our invention to provide new compounds. A further object is to provide a process for preparing these new compounds. Other objects will become apparent hereinafter.

The new pyrrole dimethinecyanine compounds of our invention can be represented by the following general formula:

I.

wherein R represents an alkyl group, e. g. methyl, ethyl, n-propyl, isobutyl, n-butyl, β-hydroxyethyl, β-ethoxyethyl, γ-hydroxypropyl, β-methoxyethyl, etc., $R_1$ represents a member selected from the group consisting of an alkyl group, e. g. methyl, ethyl, n-propyl, isopropyl, n-butyl, isobutyl, n-amyl, n-heptyl, n-decyl, lauryl, cetyl, benzyl, cyclohexyl, β-methoxyethyl, etc., an aryl group, e. g. phenol, p-chlorophenyl, p-ethoxyphenyl, etc., $R_2$ represents an alkyl group, e. g. methyl, ethyl, etc., X represents an anion, e. g. chloride, bromide, iodide, benzene-sulfonate, p-toluene-sulfonate, acetate, propionate, methylsulfate, ethylsulfate, thiocyanate, etc., and Z represents the non-metallic atoms necessary to complete a nucleus of the quinoline series, e. g. quinoline, 6-methoxyquinoline, 6-chloroquinoline, 6-methylquinoline, 6-dimethylaminoquinoline, etc.

The dyes of this invention are prepared by condensing a pyrrolecarboxaldehyde selected from those represented by the following general formula:

II.

wherein $R_1$ and $R_2$ have the values given above, with a quinoline quaternary salt selected from those which are represented by the following general formula:

III.

wherein R, X and Z have the values given above. The condensations are advantageously effected in the presence of a secondary amine, e. g. piperidine, 2-methylpiperidine, 3-methylpiperidine, 4-methylpiperidine, 2,4 - dimethylpiperidine, 2,6-dimethylpiperidine, etc. The condensations are advantageously effected in a solvent, e. g. methyl, ethyl, n-propyl, isopropyl, n-butyl or isobutyl alcohols.

The following examples will serve to illustrate further the manner of practicing our invention.

*Example 1.* — *[1-methylquinoline - (4)] [2,5 - dimethyl - 1 - phenylpyrrole - (3)]dimethinecyanine iodide and chloride*

14.25 g. of lepidine methiodide, 10 g. of 2,5-dimethyl-1-phenylpyrrole-3-carboxaldehyde, 60 cc. of methyl alcohol and 12 drops of piperidine were mixed and refluxed for 4 hours. The dark solution was chilled in the refrigerator and orange crystals of dye-iodide separated. They were filtered off and washed with acetone. 15.5 g. (66 per cent yield) of orange brown crystals of dye-iodide were obtained which after two recrystallizations from methyl alcohol had a melting point of 263°–265° C. with decomposition. Analysis: I calc. 27.23; found 26.82. The purified dye-iodide was converted to the dye-chloride by treating a boiling methyl alcoholic solution of 11.8 g. of the dye-iodide with the silver chloride prepared from 8.6 g. of silver nitrate. The solution was filtered from silver salts and concentrated to a small volume on a steam bath. The dye-chloride was precipitated with diethyl ether and filtered off. It was dried. A yield of 9.5 g. of dye-chloride was obtained which is 47 per cent yield. Brick red powder melting at 261°–262° C. with decomposition.

Analysis: Cl calc. 9.46; found 9.12.

*Example 2.*—[2,5-dimethyl-1-phenylpyrrole-(3)] [6 - methoxy - 1 - methylquinoline - (4)] dimethinecyanine iodide and chloride

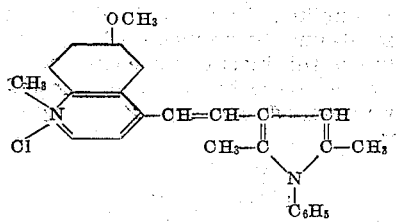

15.8 g. of 6-methoxylepidine methiodide, 10 g. of 2,5-dimethyl-1-phenylpyrrole-3-carboxaldehyde, 300 cc. of methyl alcohol and 0.5 cc. of piperidine were mixed and refluxed for 5 hours. The dye-iodide separated from the hot solution on stirring. The mixture was chilled, and the dye-iodide collected on a filter. It was washed with acetone. A yield of 15 g. (60 per cent) orange needles was obtained which on recrystallization twice from methyl alcohol had a melting point of 259°–261° C. with decomposition. Analysis: I calc. 25.58; found 25.63. 11.5 g. of purified dye-iodide was converted to the dye-chloride by treatment with silver chloride prepared from 7.9 g. of silver nitrate in boiling methyl alcohol. The silver salts were filtered off and the solution concentrated to a small volume on a steam bath. The dye-chloride was precipitated with diethyl ether and filtered off. A yield of 9.8 g. (46 per cent) of a brick red powder was obtained of melting point 112–115° C. with decomposition. Analysis: Cl calc. 8.76; found 8.78.

*Example 3.*—[1 - n - amyl-2,5-dimethylpyrrole-(3)] [1 - methylquinoline- (4)] dimethinecyanine iodide and chloride 11.4 g. of lepidine methiodide, 8 g. of 1-n-amyl-2,5-dimethylpyrrole-3-carboxaldehyde, 20 cc. of methyl alcohol and 0.4 cc. of piperidine were mixed and refluxed for 1½ hours. The solution was chilled and the dye-iodide which separated was filtered off and washed with acetone and then with water. A yield of 11.6 g. (63 per cent) of dye-iodide was obtained as brown needles which after recrystallization twice from ethyl alcohol had a melting point of 215–218° C. with decomposition. Analysis: I calc. 27.58; found 27.72. 13.4 g. of dye-iodide was converted to dye-chloride by treatment with the silver chloride from 10 g. of silver nitrate in boiling methyl alcohol. The silver salts were filtered off and the solution was concentrated to a small volume. The dye-chloride was precipitated with diethyl ether, and was filtered off and dried. A yield of 10.1 g. of red powder was obtained which is a yield of 94 per cent.

*Example 4.*—[1-n-amyl-2,5-dimethylpyrrole-(3)] [1-ethylquinoline-(4)] dimethinecyanine iodide and chloride 12 g. of lepidine ethiodide, 8 g. of 1-n-amyl-2,5-dimethylpyrrole-3-carboxaldehyde, 15 cc. of methyl alcohol and 0.5 cc. piperidine were mixed in a 200 cc. flask and refluxed for 1½ hours. The solution was chilled in a refrigerator and the dye-iodide which separated was filtered off. It was washed with acetone and then water and dried. A yield of 9 g. (48 per cent) of small dark red needles was obtained which after two recrystallizations from ethyl alcohol had a melting point of 185° C. with decomposition. Analysis: I calc. 26.77; found 26.49. 7.5 g. of the purified dye-iodide was converted to the dye-chloride by treating a boiling methyl alcohol solution with silver chloride from 5.4 g. of silver nitrate. The silver salts were filtered off and the solution concentrated to a small volume. The dye-chloride was precipitated with diethyl ether and filtered off. A yield of 4.9 g. of a red powder was obtained which is a yield of 82 per cent.

*Example 5.*—[1 - n - amyl-2,5-dimethylpyrrole-(3)] [1-n-propylquinoline-(4)] dimethinecyanine iodide and chloride 12.5 g. of lepidine n-propiodide, 8 g. of 1-n-amyl-2,5-dimethylpyrrole-3-carboxaldehyde, 15 cc. of methyl alcohol and 0.5 cc. piperidine were mixed in a flask and refluxed for 1½ hours. The solution was chilled in a refrigerator and the dye-iodide was filtered off. It was washed with acetone and then with water and dried. A yield of 9.6 g. (49 per cent) of dark red needles was obtained which had a melting point of 166°–167° C. with decomposition, after two recrystallizations from ethyl alcohol. Analysis: I calc. 26.00; found 26.10. 7.5 g. of purified dye-iodide was converted to the dye-chloride by treatment of a boiling methyl alcoholic solution of the dye-iodide with silver chloride from 5.3 g. silver nitrate. The silver salts were filtered off and the filtrate concentrated to a small volume on a steam bath. The dye-chloride is precipitated from the residue with diethyl ether. It was filtered off and dried. A yield of 5.8 g. of a red powder was obtained, which is 95 per cent recovery.

*Example 6.*—[1 - n - amyl-2,5-dimethylpyrrole-(3)] [1 - β - hydroxyethylquinoline-(4)] dimethinecyanine chloride 10.7 g. of lepidine-β-hydroxyethobromide, 8 g. of 1 - n - amyl-2,5-dimethylpyrrole-3-carboxaldehyde, 20 cc. of methyl alcohol and 0.5 cc. piperidine were mixed in a flask and refluxed for 1½ hours. The dye-iodide separated in the hot. The reaction mixture was chilled in a refrigerator and then filtered off. The dye-iodide was washed with acetone then with water and dried. A yield of 10.4 g. (59 per cent) of orange needles were obtained, which after two recrystallizations from ethyl alcohol had a melting point of 200°–202° C.

with decomposition. Analysis: I calc. 18.03; found 18.28. 7.5 g. of purified dye-iodide was converted to dye-chloride by treatment of the boiling methyl alcoholic solution with silver chloride from 5.4 g. silver nitrate. After four hours, the silver salts were filtered off and the filtrate concentrated to a small volume on a steam bath. The dye-chloride was precipitated from the cooled residue with diethyl ether. It was filtered and washed with diethyl ether. A yield of 5 g. of a reddish powder was obtained which is 83 per cent of the theoretical recovery.

*Example 7.—[1-n-decyl-2,5-dimethylpyrrole-(3)] [1-ethylquinoline-(4)]-dimethinecyanine chloride*

7.8 g. of lepidine ethiodide, 6.8 g. of 1-n-decyl-2,5-dimethylpyrrole-3-carboxaldehyde, 15 cc. of methyl alcohol and 0.3 cc. piperidine were mixed in a flask and refluxed for 1 hour. The solution was chilled in a refrigerator and then filtered off. The dye-iodide was washed lightly with acetone and then with water, and dried. A yield of 8.7 g. (61 per cent) of an orange powder was obtained which after two recrystallizations from ethyl alcohol had a melting point of 183°–184° C. with decomposition. Analysis: I calc. 23.32; found 23.92. 7.4 g. of purified dye-iodide was converted to the dye-chloride by treatment of a boiling methyl alcoholic solution with the silver chloride from 4.6 g. silver nitrate. The silver salts were then filtered off and the filtrate concentrated to a small volume. From the residue the dye-chloride was precipitated with diethyl ether. It was filtered off and washed with diethyl ether and dried. A yield of 4 g. of an orange powder was obtained which is a recovery of 65 per cent.

In a manner similar to that disclosed in the above examples any of the pyrrolecarboxaldehydes of Formula II can be condensed with any of the quinoline quaternary salts of Formula III to give pyrroledimethinecyanine salts.

The dye-chlorides described above can be converted to dye-bromides by treating a hot methyl alcoholic solution of the dye-chloride with a concentrated aqueous solution of potassium bromide. The dye-bromide separates out, upon chilling, if necessary. The dye-iodides can be converted to the corresponding dye-perchlorates by treating a hot methyl alcoholic solution of the dye-iodide with a concentrated aqueous solution of sodium perchlorate. The dye-perchlorate separates out. Dye-thiocyanates can be made from dye-iodides by stirring the dye-iodide with a hot methyl alcoholic suspension of silver thiocyanate, filtering off the silver salts, and isolating the dye-thiocyanate from the methyl alcoholic solution. Dye-acetates can be prepared from dye-iodides in a similar manner using silver acetate instead of silver thiocyanate.

The herein-described dyes are of particular value in the treatment of worm infestations where the invading organism is of the class Nemotoda (round worms.) Among the various species of worms affected by these dyes are hookworms, ascarids, filarids and whipworms. The dyes containing an anion, such as chloride, benzenesulfonate, p-toluenesulfonate, methylsulfate, ethylsulfate, acetate or propionate, are the more soluble dyes and the most useful therapeutically. In the above general Formula I, the compounds wherein the total number of carbon atoms contained in the two groups R and R₁ is from 5 to 18 are especially useful in the treatment of worm infestations.

The pyrrolecarboxaldehydes employed herein can be prepared by condensing formamide with a pyrrole base selected from those represented by the following general formula:

III.
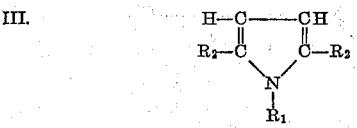

wherein $R_1$ and $R_2$ have the values given above, in the presence of phosphorous oxychloride, according to the method of Nenitzeseu and Isacescu, Bull. Soc. Chim. Romania 11, 135 (1929). Details of this preparation are also given by Brooker and Sprague Jour. Am. Chem. Soc. 67, 1869 (1945), and by Brooker and Sprague in their copending application Serial No. 407,033, filed August 15, 1941. The pyrrole bases of Formula III can be prepared according to the process of Lions et al., Proc. Royal Soc., New South Wales, 71, 92 (1937).

The quinoline quaternary salts employed herein can be prepared in known manner, by heating the quinoline bases with the appropriate alkyl salt, e. g. methyl iodide, methyl p-toluene-sulfonate, n-butyl bromide, dimethyl sulfate, etc. at temperatures of from about 90° to 150° C., heating the base and alkyl salt in a sealed tube where the alkyl salt is too volatile to permit sufficient heating under reflux.

What we claim as our invention and desire to be secured by Letters Patent of the United States is:

1. The compounds which are represented by the following general formula:

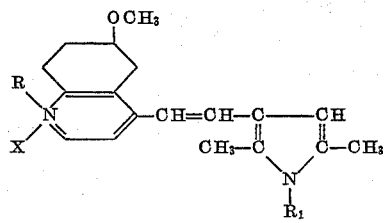

wherein R represents a primary alkyl group containing from 1 to 4 carbon atoms, $R_1$ represents an aryl group of the benzene series, the total number of carbon atoms in the R and $R_1$ groups being from 7 to 18, and X represents an anion.

2. The compound which is represented by the following formula:

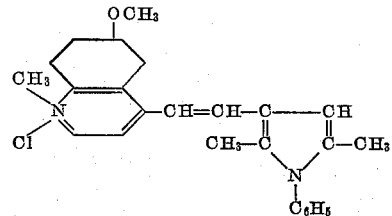

3. The compounds which are represented by the following general formula:

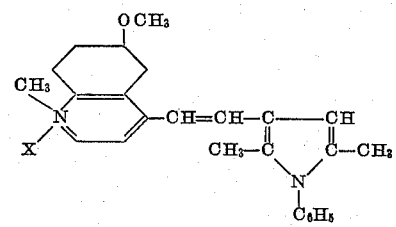

wherein X represents an anion.

4. The compound which is represented by the following formula:
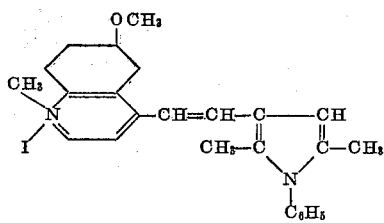
ROBERT H. SPRAGUE.
LESLIE G. S. BROOKER.
REFERENCES CITED
The following references are of record in the file of this patent:
UNITED STATES PATENTS
| Number | Name | Date |
|---|---|---|
| 2,051,134 | Dieterle | Aug. 18, 1936 |
FOREIGN PATENTS
| Number | Country | Date |
|---|---|---|
| 529,440 | Great Britain | Nov. 21, 1940 |